United States Patent
Jun et al.

(10) Patent No.: US 9,784,999 B2
(45) Date of Patent: Oct. 10, 2017

(54) LIQUID CRYSTAL DISPLAY WITH NARROW BEZEL AREA

(71) Applicant: LG DISPLAY CO., LTD., Seoul (KR)

(72) Inventors: Byeongdeog Jun, Namyul-ri (KR); Jaewoo Park, Gumi-si (KR); Kou Choi, Gumi-si (KR); Kyungmin Kim, Busan (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/134,395

(22) Filed: Dec. 19, 2013

(65) Prior Publication Data

US 2014/0285747 A1 Sep. 25, 2014

(30) Foreign Application Priority Data

Mar. 20, 2013 (KR) .................. 10-2013-0029598
Mar. 20, 2013 (KR) .................. 10-2013-0029601

(51) Int. Cl.
*G02F 1/1333* (2006.01)
*F21V 8/00* (2006.01)

(52) U.S. Cl.
CPC ..... *G02F 1/133308* (2013.01); *G02B 6/0088* (2013.01); *G02F 2001/133317* (2013.01)

(58) Field of Classification Search
CPC ... G02F 1/133308; G02F 2001/133317; G02B 6/0088
See application file for complete search history.

(56) References Cited

U.S. PATENT DOCUMENTS

| | | | |
|---|---|---|---|
| 6,655,788 B1 * | 12/2003 | Freeman | 347/58 |
| 7,719,627 B2 * | 5/2010 | Okuda | G02F 1/13452 349/149 |
| 8,031,316 B2 * | 10/2011 | Fukai | G02F 1/133615 349/110 |
| 8,530,009 B2 * | 9/2013 | Park et al. | 428/1.5 |

(Continued)

FOREIGN PATENT DOCUMENTS

| | | |
|---|---|---|
| CN | 1662844 A | 8/2005 |
| CN | 101452150 A | 6/2009 |

(Continued)

OTHER PUBLICATIONS

English translation of JP 2011164185 A, TitleElectro-Optical Device and Electronic Apparatus, Author: Sakai Toyohiro ; Date of publication: Aug. 25, 2011.*

(Continued)

*Primary Examiner* — Edward Glick
*Assistant Examiner* — Shan Liu
(74) *Attorney, Agent, or Firm* — Brinks Gilson & Lione

(57) ABSTRACT

A liquid crystal display with a narrow bezel area includes a liquid crystal display panel displaying an image, a light source unit supplying light to the liquid crystal display panel, a light guide plate converting light irradiated by the light source unit into planar light, a cover bottom which includes a bottom part and side walls extending from edges of the bottom part to an upper side and receives the light source unit and the light guide plate, and a supporting member which surrounds an external surface of the cover bottom, extends from an upper part of the light guide plate to the inside of the cover bottom, and supports the liquid crystal display panel.

9 Claims, 11 Drawing Sheets

(56) References Cited

U.S. PATENT DOCUMENTS

| | | | |
|---|---|---|---|
| 8,845,177 B2* | 9/2014 | Kuo | G02F 1/133608 362/613 |
| 2001/0050732 A1* | 12/2001 | Okamoto et al. | 349/58 |
| 2005/0030443 A1* | 2/2005 | Nagahama | G02B 6/0088 349/64 |
| 2005/0286008 A1* | 12/2005 | Miyagawa | G06F 1/1601 349/158 |
| 2007/0035950 A1* | 2/2007 | Yang | G02F 1/133615 362/294 |
| 2008/0291354 A1* | 11/2008 | Oh | 349/58 |
| 2009/0147174 A1* | 6/2009 | Ha et al. | 349/58 |
| 2009/0303409 A1* | 12/2009 | Park | G02F 1/133308 349/58 |
| 2010/0118229 A1* | 5/2010 | Kim | B29C 45/14065 349/64 |
| 2010/0149835 A1* | 6/2010 | Cho | G02B 6/0091 362/612 |
| 2011/0128463 A1* | 6/2011 | Ji | G02F 1/133308 349/58 |
| 2011/0236643 A1* | 9/2011 | Tsubouchi | G02F 1/133308 428/192 |
| 2011/0310543 A1* | 12/2011 | Kim | 361/679.01 |
| 2012/0162569 A1* | 6/2012 | Sekiguchi | G02F 1/133308 349/58 |
| 2013/0002976 A1* | 1/2013 | Notermans | F21S 8/00 349/58 |
| 2014/0133174 A1* | 5/2014 | Franklin | G02B 6/0088 362/606 |
| 2014/0168534 A1* | 6/2014 | Hwang | G02F 1/1309 349/12 |
| 2015/0146130 A1* | 5/2015 | Chen | G02F 1/133308 349/58 |

FOREIGN PATENT DOCUMENTS

| | | | |
|---|---|---|---|
| CN | 102043268 A | | 5/2011 |
| CN | JP 2011-164185 A | | 8/2011 |
| CN | 102298225 A | | 12/2011 |
| JP | 2011164185 A | * | 8/2011 |

OTHER PUBLICATIONS

Office Action dated Apr. 8, 2016 for Chinese Application No. 201310712452.8, 19 pages.

* cited by examiner

LIQUID CRYSTAL DISPLAY WITH NARROW BEZEL AREA

This application claims the benefit of priority under U.S.C §119(a) to Korea Patent Application No. 10-2013-0029598 filed on Mar. 20, 2013 and Korea Patent Application No. 10-2013-0029601 filed on Mar. 20, 2013, the entire contents of each of which are incorporated herein in their entirety.

BACKGROUND

Field of the Disclosure

Embodiments of the disclosure are relate to a liquid crystal display, and more particularly to a liquid crystal display with a narrow bezel area.

Discussion of the Related Art

In general, a liquid crystal display adjusts a light transmittance of liquid crystal cells arranged in a matrix based on information of an image signal to display a desired image on a liquid crystal display panel using light provided by a backlight unit of the liquid crystal display.

Applications of the liquid crystal display using such a principle are increasingly growing due to characteristics, such as light weight, thin profile, and low power consumption driving. Following this trend, the liquid crystal display has been used in a television, a computer monitor, an indoor and outdoor advertisement display, a display unit of an office automation equipment, a display unit of an audio/video equipment, a display unit of a home appliance, and the like. In recent, the liquid crystal display has been widely applied to a display device of a car navigation system, a portable display device such as a notebook computer, a netbook, a personal digital assistant (PDA), a mobile phone, and a smart phone, and the like. A transmission type liquid crystal display, which is the most common liquid crystal display, controls an electric field applied to a liquid crystal layer and modulates light provided by the backlight unit, thereby displaying an image.

Most of the liquid crystal displays having the above-described configuration are a non-emissive type display device displaying the image by adjusting an amount of light coming from the outside and thus require the backlight unit including separate light sources for irradiating light onto the liquid crystal display panel.

The backlight unit is classified into a direct type backlight unit and an edge type backlight unit. The direct type backlight unit has a structure, in which the several light sources are arranged on a lower surface of a diffusion plate in a row to allow light to directly travel to a front surface of the liquid crystal display. The edge type backlight unit has a structure, in which the light sources are disposed opposite the side of a light guide plate and a plurality of optical films are disposed between the liquid crystal display panel and the light guide plate. In the edge type backlight unit, the light sources irradiate light onto one side of the light guide plate, and the light guide plate converts linear light or point light emitted from the light sources into planar light and causes the planar light to travel to a front surface of the liquid crystal display.

The edge type backlight unit includes a cover bottom, the light sources supplying light from one side of the cover bottom to the liquid crystal display panel, the light guide plate which is installed under the liquid crystal display panel so as to induce light from the light sources to the liquid crystal display panel, a reflective sheet for reflecting light reflected to a lower part of the light guide plate to a front surface of the light guide plate, a plurality of optical sheets which are stacked on the light guide plate and uniformly supply light to the liquid crystal display panel, and a guide panel which is coupled with the cover bottom and supports the liquid crystal display panel.

A cold cathode fluorescent lamp (CCFL), a hot cathode fluorescent lamp (HCFL), an external electrode fluorescent lamp (EEFL), etc. have been used as the related art light sources of the backlight unit. Because a light emitting diode (LED) has advantages of a reduction in power consumption because it can be driven at a low voltage and also has advantages of excellent color reproduction, an excellent contrast ratio, and a long life span, the LED has recently come into the spotlight.

The guide panel is a rectangular mold frame formed by mixing a glass fiber with a synthetic resin, for example, polycarbonate. The guide panel surrounds a lower surface and a side surface of the liquid crystal display panel and a side surface of the backlight unit, thereby supporting the liquid crystal display panel and uniformly maintaining a distance between the liquid crystal display panel and the optical sheets.

The liquid crystal display panel and the backlight unit are packed by an upper cover bottom and a lower cover bottom of the cover bottom. In this instance, an edge of the liquid crystal display panel is covered by a light-shielding pad so that its inner components are prevented from being seen or light is prevented from leaking. A portion covered by the light-shielding pad is referred to as a bezel area.

The bezel area is a portion, on which the image is not displayed, and forms a rim of the screen of the liquid crystal display. Therefore, an increase in the size of the bezel area results in a reduction in the size of an effective display area of the liquid crystal display panel. Thus, an attempt has been made to obtain a visual effect, in which it is perceived that the screen of the liquid crystal display is greater than the real screen by reducing the size of the bezel area.

However, because the guide panel supports the liquid crystal display panel in a state where the guide panel is coupled with the side of the cover bottom of the backlight unit and the side of the liquid crystal display panel in the bezel area forming the rim of the screen of the liquid crystal display, it is difficult to reduce an area, which the guide panel occupies, in the side of the cover bottom and the side of the liquid crystal display panel. Hence, it is limited to a reduction in the bezel area.

SUMMARY

A liquid crystal display comprises a liquid crystal display panel configured to display an image, a light source unit configured to supply light to the liquid crystal display panel, a light guide plate configured to convert light irradiated by the light source unit into planar light, a cover bottom including a bottom part and side walls extending from edges of the bottom part to an upper side, the cover bottom receiving the light source unit and the light guide plate, and a supporting member configured to surround an external surface of the cover bottom, extend from an upper part of the light guide plate to the inside of the cover bottom, and support the liquid crystal display panel.

In another aspect, a liquid crystal display comprises a liquid crystal display panel configured to display an image, a light source unit configured to supply light to the liquid crystal display panel, a light guide plate configured to convert light irradiated by the light source unit into planar light, a cover bottom including a bottom part and side walls extending from edges of the bottom part to an upper side, the cover bottom receiving the light source unit, the light guide plate, and the liquid crystal display panel, and a supporting member which is attached to inner surfaces of opposite side walls of the cover bottom, extends to an inside of the cover bottom along an upper part of the light guide plate, and supports the liquid crystal display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
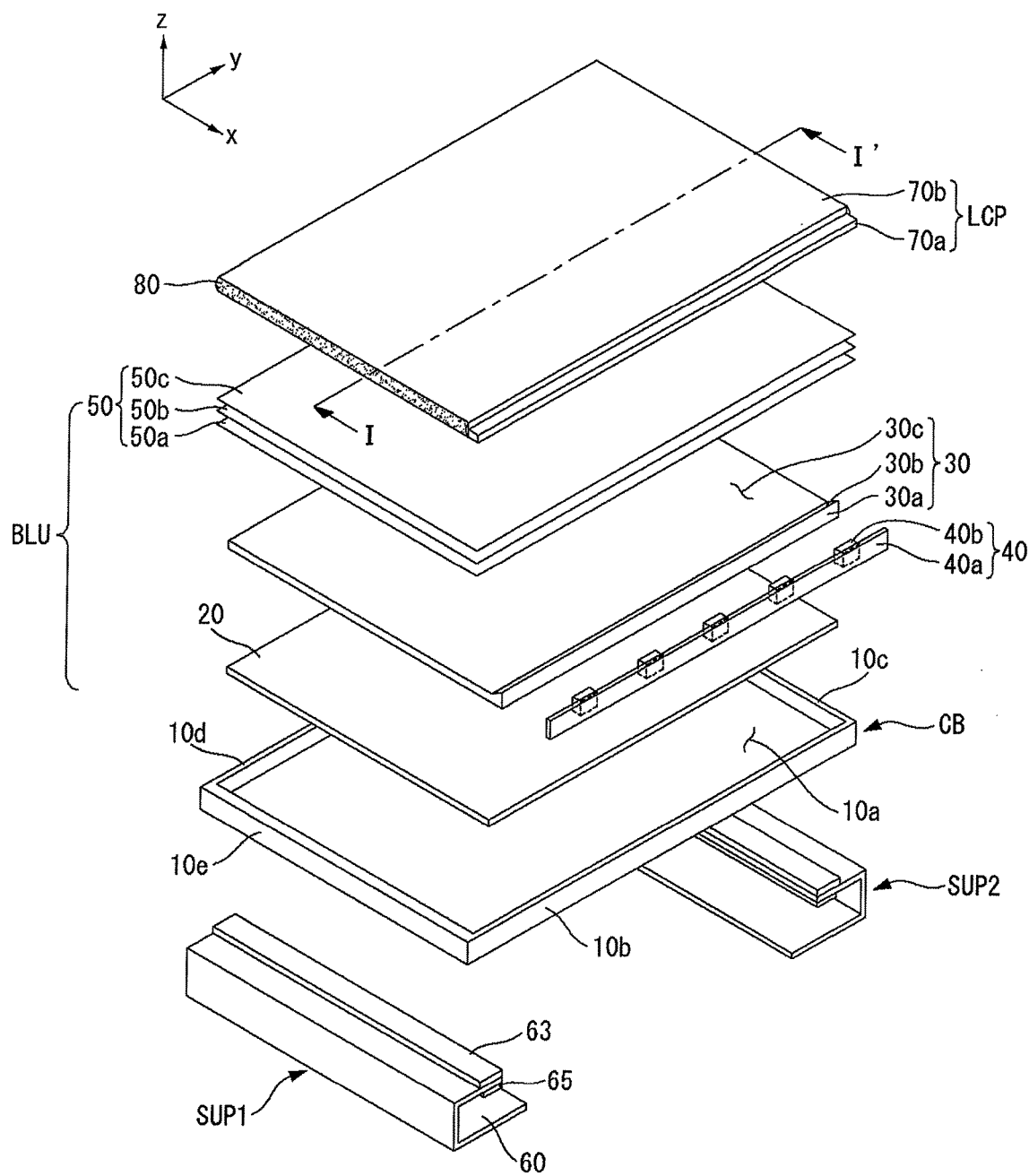
FIG. 1 is an exploded perspective view schematically showing a liquid crystal display according to a first embodiment of the invention.

A liquid crystal display according to a first embodiment of the invention is described with reference to FIGS. 1 to 3. FIG. 1 is an exploded perspective view schematically showing the liquid crystal display according to the first embodiment of the invention, and FIGS. 2 and 3 are cross-sectionals view taken along line I-I' of FIG. 1.

Figure 2:
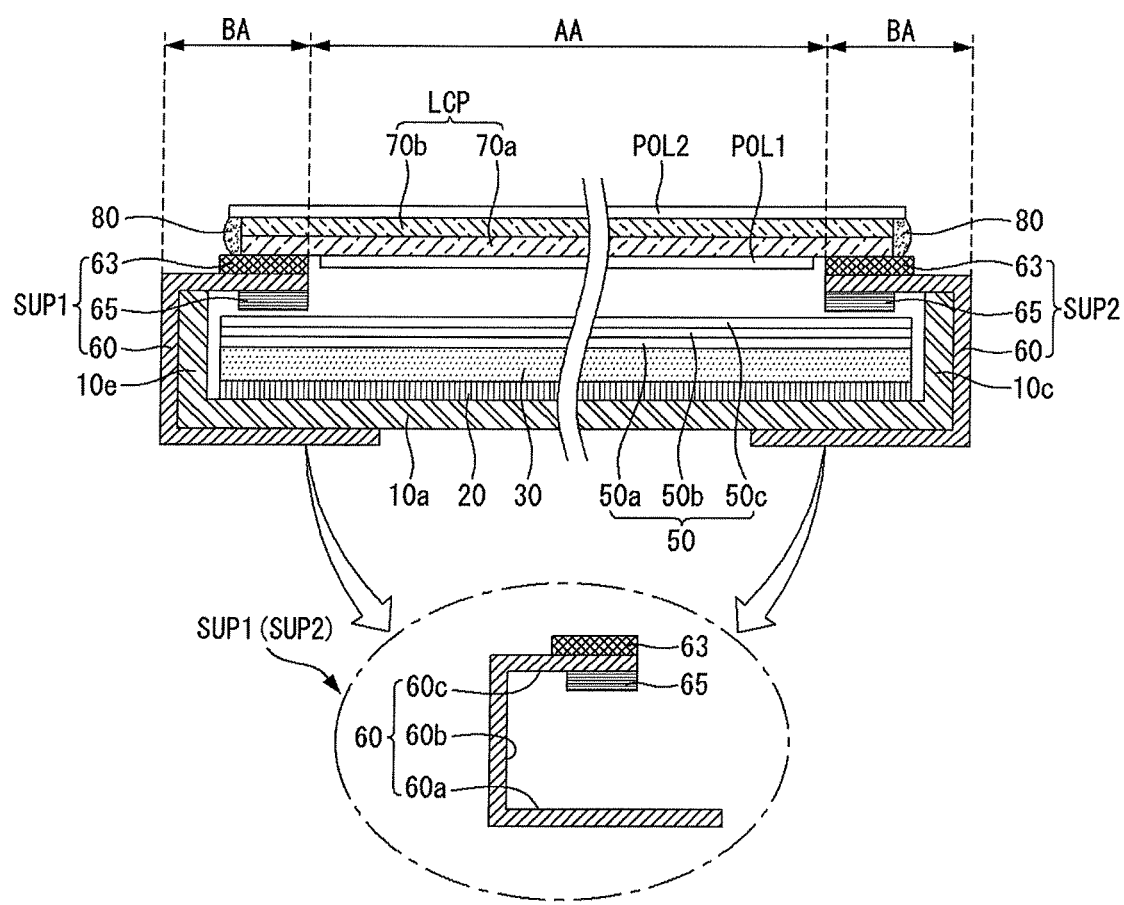
FIG. 2 is a cross-sectional view taken along line I-I' of FIG. 1 and shows an example where an upper polarizing plate is attached to a color filter substrate of a liquid crystal display panel so that both ends of the upper polarizing plate protrude to the outside of the color filter substrate, and a lower polarizing plate is formed on a thin film transistor (TFT) substrate of the liquid crystal display panel between light-shielding pads of supporting members.
Figure 3:
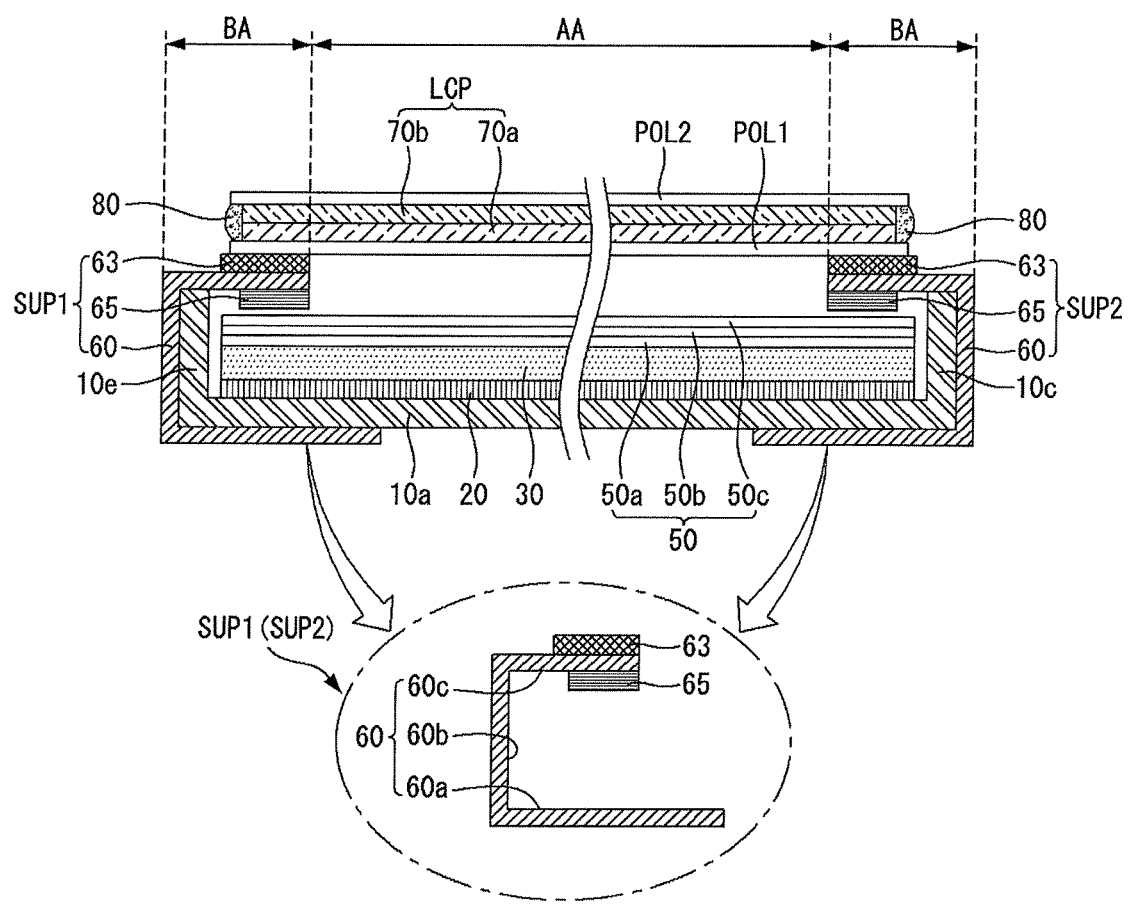
FIG. 3 is a cross-sectional view taken along line I-I' of FIG. 1 and shows an example where an upper polarizing plate is attached to a color filter substrate of a liquid crystal display panel so that both ends of the upper polarizing plate protrude to the outside of the color filter substrate, and a lower polarizing plate is attached to both a TFT substrate of the liquid crystal display panel and light-shielding pads of supporting members.

Referring to FIGS. 1 to 3, the liquid crystal display according to the first embodiment of the invention includes a cover bottom CB, a backlight unit BLU received in the cover bottom CB, a liquid crystal display panel LCP disposed on the backlight unit BLU, and first and second supporting members SUP1 and SUP2 which are coupled with the cover bottom CB and support the liquid crystal display panel LCP.

The cover bottom CB includes a bottom part 10a on which the backlight unit BLU is positioned, and side walls 10b, 10c, 10d, and 10e extending from an edge of the bottom part 10a to the top. The cover bottom CB has a box shape, of which an upper part is opened. The cover bottom CB is formed of stainless steel (SUS) with excellent rigidity. A reflective sheet 20, a light guide plate 30, a light source unit 40, and an optical sheet 50 which constitute the backlight unit BLU, are sequentially stacked on the bottom part 10a of the cover bottom CB.

The backlight unit BLU includes the light source unit 40 supplying light to the liquid crystal display panel LCP, the light guide plate 30 which guides light coming from the light source unit 40 and supplies the light to the liquid crystal display panel LCP, the reflective sheet 20 which is positioned under the light guide plate 30 and reflects the light, and the optical sheet 50 which is positioned on the light guide plate 30, converts the light supplied by light sources 40b of the light source unit 40 into uniform planar light, and supplies the planar light to the liquid crystal display panel LCP.

The light source unit 40 is an edge type light source unit, in which the light source unit 40 is positioned opposite an incident surface 30a of the light guide plate 30. The light source unit 40 includes a printed circuit board (PCB) 40a and at least one light emitting diode (LED) 40b (hereinafter referred to as "light source") mounted on the PCB 40a. The PCB 40a is a flexible board with excellent flexibility and turns on or off the light source 40b through a circuit mounted therein. In the first embodiment of the invention, the light source 40b may be configured as a top view type. In this instance, the flexible printed circuit board (FPCB) 40a may be installed on the side wall 10b of the cover bottom CB, and an upper part of the light source 40b mounted on the FPCB 40a may be positioned opposite the incident surface 30a of the light guide plate 30. Alternatively, the light source 40b may be configured as a side view type. In this instance, the FPCB 40a may be installed on the bottom part 10a of the cover bottom CB, and the side of the light source 40b mounted on the FPCB 40a may be positioned opposite the incident surface 30a of the light guide plate 30.

Because the incident surface 30a of the light guide plate 30 is positioned opposite the light source 40b, light emitted from the light source 40b is incident on the light guide plate 30 through the incident surface 30a. In this instance, the light guide plate 30 causes light, which is emitted from the light source 40b and then is incident on the incident surface 30a of the light guide plate 30, to travel in an upward direction of the light guide plate 30, i.e., toward the liquid crystal display panel LCP. For this, a diffusion pattern (not shown), which scatters light traveling to a lower part of the light guide plate 30 to thereby cause the light to travel in the upward direction of the light guide plate 30, may be formed on a bottom surface of the light guide plate 30. The light guide plate 30 converts the light incident from the light source 40b into uniform planar light and emits the planar light to the optical sheet 50 positioned on the light guide plate 30. The light guide plate 30 is formed of a material having a good refractive index and a good transmittance, for example, polymethylenemethacrylate (PMA), polycarbonate (PC), polyethylene (PE), cycloolefin-based resin (for example, cycloolefin polymer (COP)), etc. Other materials may be used for the light guide plate 30.

The light guide plate 30 includes the incident surface 30a, on which light from the light source 40b is incident, an emissive surface 30c, positioned opposite the liquid crystal display panel LCP, from which the incident light is emitted, and an inclined surface 30b connecting the incident surface 30a to the emissive surface 30c. In this instance, a height of the inclined surface 30b is gradually lowered as it goes from the incident surface 30a to the emissive surface 30c. The emissive surface 30c has a constant height. Alternatively, the light guide plate 30 may have the same height without including the inclined surface 30b.

The reflective sheet 20 is disposed between the bottom part 10a of the cover bottom CB and the light guide plate 30. The reflective sheet 20 reflects light, which is incident on the incident surface 30a of the light guide plate 30 and is emitted to the lower part of the light guide plate 30, to the light guide plate 30, thereby increasing efficiency of the light. Further, the reflective sheet 20 adjusts a reflective amount of the entire incident light so that the light emitted from the entire emissive surface 30c has a uniform luminance distribution.

The optical sheet 50 includes a diffusion sheet 50a, a prism sheet 50b, and a protective sheet 50c to diffuse and focus light incident from the light guide plate 30. The diffusion sheet 50a includes a base plate and a bead-shaped coating layer formed on the base plate. The diffusion sheet 50a diffuses light from the light source 40b and supplies the light to the liquid crystal display panel LCP. The prism sheet 50b is formed by uniformly arranging triangular cylinder-shaped prisms on an upper surface of the prism sheet 50b and focuses the light diffused by the diffusion sheet 50a in a direction vertical to the plane of the liquid crystal display panel LCP. The protective sheet 50c is formed on the prism sheet 50b so as to protect the prism sheet 50b weak to a scratch.

Each of the first and second supporting members SUP1 and SUP2 includes a base member 60, a light-shielding pad 63, and a hold pad 65.

The base members 60 of the first and second supporting members SUP1 and SUP2 surround a partial external surface of the bottom part 10a of the cover bottom CB and external surfaces and upper surfaces of the side walls 10c and 10e of the cover bottom CB. The base member 60 bends to the inside of the cover bottom CB and has a "⊏" shape. More specifically, the base member 60 includes a first part 60a attached to the partial external surface of the bottom part 10a of the cover bottom CB, a second part 60b which bends from the first part 60a and is attached to the external surface of the side wall 10c (or 10e) of the cover bottom CB, and a third part 60c which bends from the second part 60b, is attached to the upper surface of the side wall 10c (or 10e), and extends to the inside of the cover bottom CB. The base member 60 is formed of a thermoplastic material, for example, polyethylene terephthalate (PET).

The light-shielding pad 63 is attached to an upper surface of the third part 60c of the base member 60 and supports and fixes the liquid crystal display panel LCP which will be disposed on the light-shielding pad 63. Further, the light-shielding pad 63 prevents light from leaking to a bezel area BA. The light-shielding pad 63 divides the liquid crystal display panel LCP into a display area AA on which an image is displayed, and the bezel area BA on which the image is not displayed.

The hold pad 65 is attached to a lower surface of the third part 60c of the base member 60 using, for example, a double-sided tape and prevents the separation of the optical sheet 50. Because the base member 60 is formed of a flexible material, the base members 60 of the first and second supporting members SUP1 and SUP2 may bend due to the weight of the liquid crystal display panel LCP. In this instance, the hold pad 65 may be positioned to be separated from the optical sheet 50 by a predetermined distance, so as to prevent the optical sheet 50 from being damaged by the bending of the base members 60. However, the embodiment of the invention is not limited thereto. For example, the hold pad 65 may contact the optical sheet 50 or may be attached to the optical sheet 50.

The liquid crystal display panel LCP functions to display the image. The liquid crystal display panel LCP includes a thin film transistor (TFT) substrate 70a, on which a plurality of thin film transistors (TFTs) are arranged in a matrix form, a color filter substrate 70b attached to the TFT substrate 70a, and a liquid crystal layer (not shown) disposed between the substrates 70a and 70b.

The TFT substrate 70a is a transparent glass substrate on which the TFTs are arranged in the matrix form. A data line is connected to a source terminal of the TFT, and a gate line is connected to a gate terminal of the TFT. The data line and the gate line are respectively connected to driving integrated circuit (IC) chips (not shown). The flexible printed circuit board (not shown) is connected to one side of each driving IC chip. When an electrical signal is received from the flexible printed circuit board, the electrical signal is input to each of the data line and the gate line through the driving IC chips. Hence, the TFT disposed in each pixel is turned on or off, and a driving voltage is applied to each pixel or the application of the driving voltage to each pixel is blocked. As a result, an image is displayed on the liquid crystal display panel LCP.

The TFT substrate 70a is attached to the light-shielding pads 63 of the first and second supporting members SUP1 and SUP2. More specifically, the TFT substrate 70a is attached to the light-shielding pads 63, so that the light-shielding pads 63 slightly protrude to the outside of the TFT substrate 70a.

The color filter substrate 70b is disposed on the TFT substrate 70a and is attached to the TFT substrate 70a using a sealing material 80. The color filter substrate 70b is a substrate, on which color pixels (i.e., red, green, and blue pixels), each of which represents a predetermined color while light passes through them, are formed through a thin film process.

A first polarizing plate POL1 is formed on a lower surface of the TFT substrate 70a, and a second polarizing plate POL2 is formed on an upper surface of the color filter substrate 70b, thereby polarizing light.

In the liquid crystal display shown in FIG. 2, the first polarizing plate POL1 has a rectangular shape similar to the TFT substrate 70a of the liquid crystal display panel LCP. A first width of the first polarizing plate POL1 defined by a side of the first polarizing plate POL1, on which the light source unit 40 is disposed, and a side opposite to the side is greater than a width of the TFT substrate 70a of the liquid crystal display panel LCP. Further, a second width of the first polarizing plate POL1 defined by the remaining opposite sides of the first polarizing plate POL1 is less than the width of the TFT substrate 70a of the liquid crystal display panel LCP. More specifically, the second width of the first polarizing plate POL1 is formed between the light-shielding pads 63 of the first and second supporting members SUP1 and SUP2 and thus is formed between both sides of the TFT substrate 70a of the liquid crystal display panel LCP. Hence, the second width of the first polarizing plate POL1 is less than the width of the TFT substrate 70a.

The second polarizing plate POL2 has a rectangular shape similar to the color filter substrate 70b of the liquid crystal display panel LCP. A first width of the second polarizing plate POL2 defined by a side of the second polarizing plate POL2, on which the light source unit 40 is disposed, and a side opposite to the side is greater than a width of the TFT substrate 70a of the liquid crystal display panel LCP. Further, a second width of the second polarizing plate POL2 defined by the remaining opposite sides of the second polarizing plate POL2 is greater than the width of the TFT substrate 70a of the liquid crystal display panel LCP.

In the liquid crystal display shown in FIG. 2, the sealing material 80 is disposed in a space formed by the protrusion of the second polarizing plate POL2. The sealing material 80 seals a space between the TFT substrate 70a and the color filter substrate 70b, and is positioned at an edge of the bezel area BA, thereby preventing the generation of the light leakage.

In the liquid crystal display shown in FIG. 3, the first polarizing plate POL1 has a rectangular shape similar to the TFT substrate 70a of the liquid crystal display panel LCP. A first width of the first polarizing plate POL1 defined by a side of the first polarizing plate POL1, on which the light source unit 40 is disposed, and a side opposite to the side is greater than a width of the TFT substrate 70a of the liquid crystal display panel LCP. Further, a second width of the first polarizing plate POL1 defined by the remaining opposite sides of the first polarizing plate POL1 is greater than the width of the TFT substrate 70a of the liquid crystal display panel LCP.

The second polarizing plate POL2 has a rectangular shape similar to the color filter substrate 70b of the liquid crystal display panel LCP. A first width of the second polarizing plate POL2 defined by a side of the second polarizing plate POL2, on which the light source unit 40 is disposed, and a side opposite to the side is greater than a width of the TFT substrate 70a of the liquid crystal display panel LCP. Further, a second width of the second polarizing plate POL2 defined by the remaining opposite sides of the second polarizing plate POL2 is greater than the width of the TFT substrate 70a of the liquid crystal display panel LCP.

In the liquid crystal display shown in FIG. 3, the sealing material 80 is disposed in a space formed by the protrusion of the second polarizing plate POL2. The sealing material 80 seals a space between the TFT substrate 70a and the color filter substrate 70b, and is positioned at an edge of the bezel area BA, thereby preventing the generation of the light leakage.

In the liquid crystal display according to the first embodiment of the invention, because the liquid crystal display panel LCP is supported by the first and second supporting members SUP1 and SUP2, which surround the outside of the cover bottom CB and extend to the inside of the cover bottom CB, the bezel area occupied by the related art guide panel may be decreased.

The first embodiment of the invention described that the first and second supporting members SUP1 and SUP2 support the liquid crystal display panel LCP, but is not limited thereto. For example, the liquid crystal display panel LCP may be supported by one supporting member formed by coupling the first and second supporting members SUP1 and SUP2.

Figure 4:
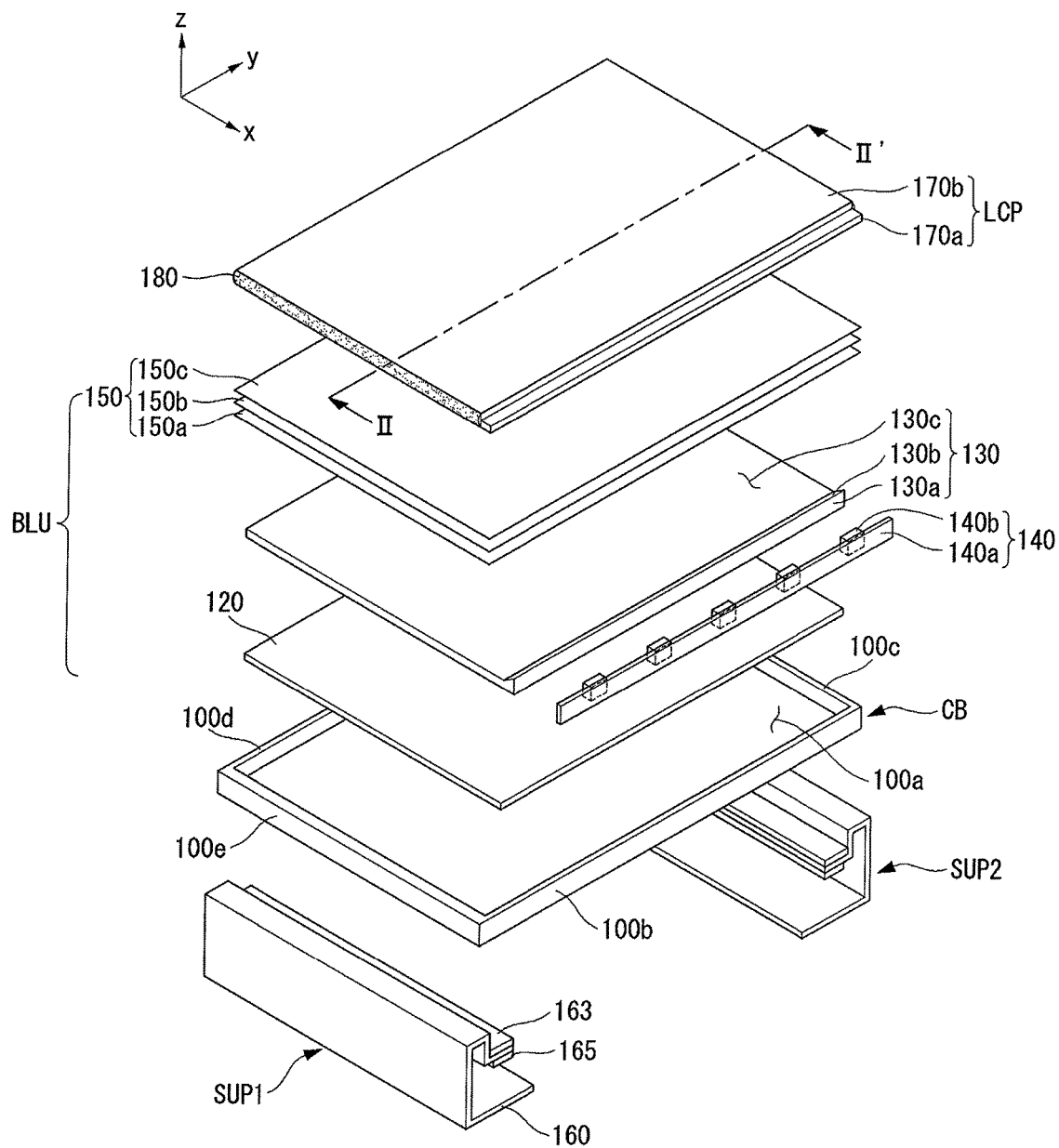
FIG. 4 is an exploded perspective view schematically showing a liquid crystal display according to a second embodiment of the invention.

Next, a liquid crystal display according to a second embodiment of the invention is described with reference to FIGS. 4 to 6. FIG. 4 is an exploded perspective view schematically showing the liquid crystal display according to the second embodiment of the invention, and FIGS. 5 and 6 are cross-sectionals view taken along line II-II' of FIG. 4.

Figure 5:
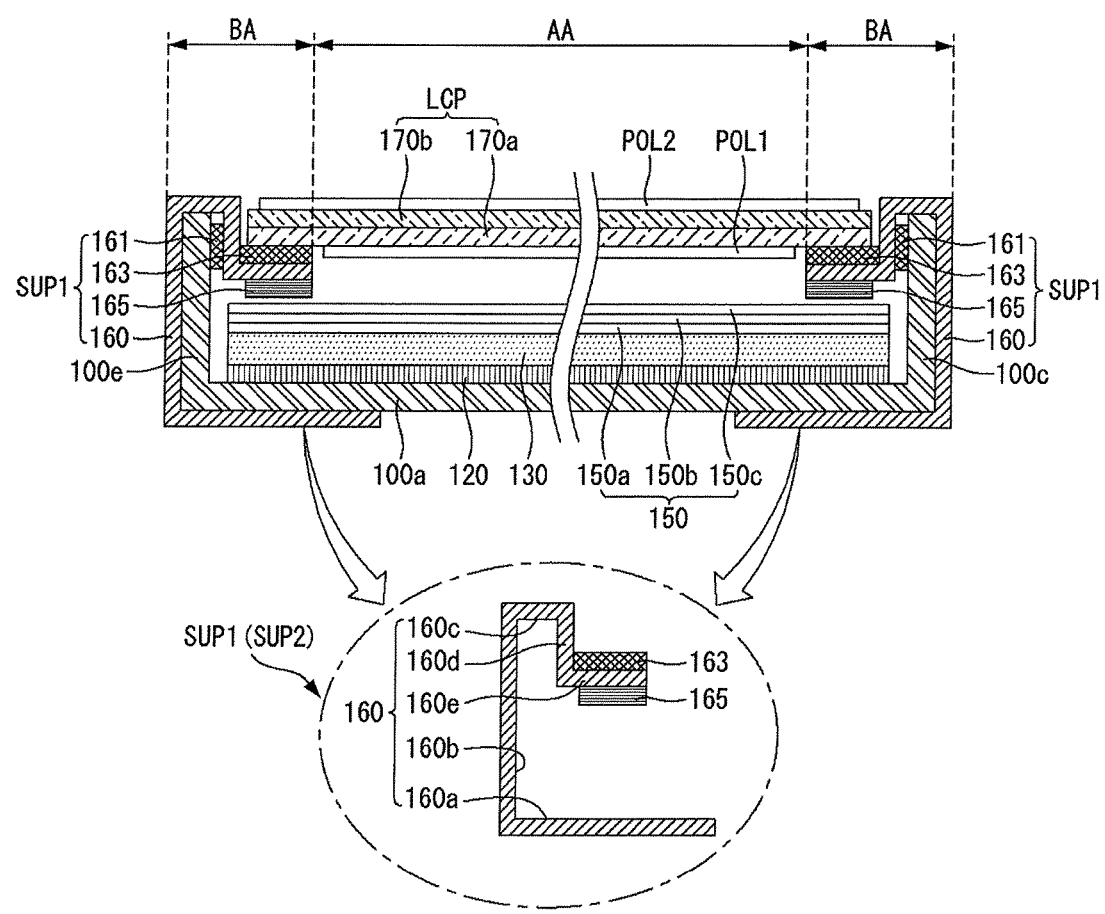
FIG. 5 is a cross-sectional view taken along line II-II' of FIG. 4 and shows an example where both ends of an upper polarizing plate are attached to a color filter substrate of a liquid crystal display panel in an area of the color filter substrate, and a lower polarizing plate is formed on a TFT substrate of the liquid crystal display panel between light-shielding pads of supporting members.
Figure 6:
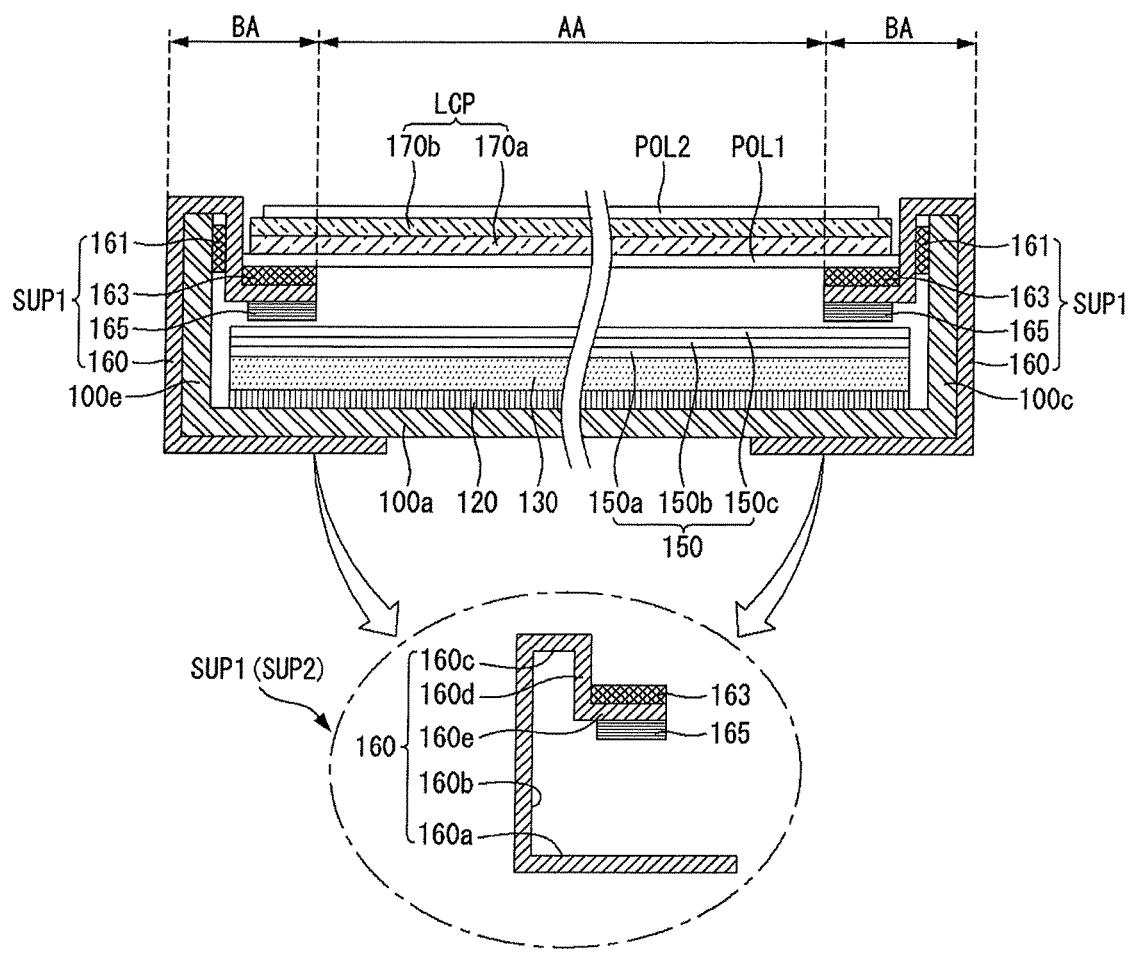
FIG. 6 is a cross-sectional view taken along line II-II' of FIG. 4 and shows an example where both ends of an upper polarizing plate are attached to a color filter substrate of a liquid crystal display panel in an area of the color filter substrate, and a lower polarizing plate is attached to both a TFT substrate of the liquid crystal display panel and light-shielding pads of supporting members.

Referring to FIGS. 4 to 6, the liquid crystal display according to the second embodiment of the invention includes a cover bottom CB, a backlight unit BLU received in the cover bottom CB, a liquid crystal display panel LCP disposed on the backlight unit BLU, and first and second supporting members SUP1 and SUP2 which are coupled with the backlight unit BLU and support the liquid crystal display panel LCP. The liquid crystal display according to the second embodiment of the invention is different from the liquid crystal display according to the first embodiment of the invention in configuration of the cover bottom CB and configuration of the first and second supporting members SUP1 and SUP2. The difference is described in detail below.

The cover bottom CB includes a bottom part 100a on which the backlight unit BLU is positioned, and side walls 100b, 100c, 100d, and 100e extending from an edge of the bottom part 100a to the top. The cover bottom CB has a box shape, of which an upper part is opened. The cover bottom CB is formed of stainless steel (SUS) with excellent rigidity. A reflective sheet 120, a light guide plate 130, a light source unit 140, and an optical sheet 150 which constitute the backlight unit BLU, and the liquid crystal display panel LCP are sequentially stacked on the bottom part 100a of the cover bottom CB. The side walls 100b, 100c, 100d, and 100e of the cover bottom CB each have a height capable of receiving the components 120, 130, 140, 150, and LCP.

The backlight unit BLU includes the light source unit 140 supplying light to the liquid crystal display panel LCP, the light guide plate 130 which guides light coming from the light source unit 140 and supplies the light to the liquid crystal display panel LCP, the reflective sheet 120 which is positioned under the light guide plate 130 and reflects the light, and the optical sheet 150 which is positioned on the light guide plate 130, converts the light supplied by light sources 140b of the light source unit 140 into uniform planar light, and supplies the planar light to the liquid crystal display panel LCP.

The light source unit 140 is an edge type light source unit, in which the light source unit 140 is positioned opposite an incident surface 130a of the light guide plate 130. The light source unit 140 includes a printed circuit board (PCB) 140a and at least one light emitting diode (LED) 140b (hereinafter referred to as "light source") mounted on the PCB 140a. The PCB 140a is a flexible board with excellent flexibility and turns on or off the light source 140b through a circuit mounted therein. In the second embodiment of the invention, the light source 140b may be configured as a top view type. In this instance, the flexible printed circuit board (FPCB) 140a may be installed on the side wall 100b of the cover bottom CB, and an upper part of the light source 140b mounted on the FPCB 140a may be positioned opposite the incident surface 130a of the light guide plate 130. Alternatively, the light source 140b may be configured as a side view type. In this instance, the FPCB 140a may be installed on the bottom part 100a of the cover bottom CB, and the side of the light source 140b mounted on the FPCB 140a may be positioned opposite the incident surface 130a of the light guide plate 130.

Because the incident surface 130a of the light guide plate 130 is positioned opposite the light source 140b, light emitted from the light source 140b is incident on the light guide plate 130 through the incident surface 130a. In this instance, the light guide plate 130 causes light, which is emitted from the light source 140b and then is incident on the incident surface 130a of the light guide plate 130, to travel in an upward direction of the light guide plate 130, i.e., toward the liquid crystal display panel LCP. For this, a diffusion pattern (not shown), which scatters light traveling to a lower part of the light guide plate 130 to thereby cause the light to travel in the upward direction of the light guide plate 130, may be formed on a bottom surface of the light guide plate 130. The light guide plate 130 converts the light incident from the light source 140b into uniform planar light and emits the planar light to the optical sheet 150 positioned on the light guide plate 130. The light guide plate 130 is formed of a material having a good refractive index and a good transmittance, for example, polymethylenemethacrylate (PMA), polycarbonate (PC), polyethylene (PE), cycloolefin-based resin (for example, cycloolefin polymer (COP)), etc. Other materials may be used for the light guide plate 130.

The light guide plate 130 includes the incident surface 130a, on which light from the light source 140b is incident, an emissive surface 130c, positioned opposite the liquid crystal display panel LCP, from which the incident light is emitted, and an inclined surface 130b connecting the incident surface 130a to the emissive surface 130c. In this instance, a height of the inclined surface 130b may be gradually lowered or may be lowered at a right angle as it goes from the incident surface 130a to the emissive surface 130c. The emissive surface 130c has a constant height. Alternatively, the incident surface 130a and the emissive surface 130c of the light guide plate 130 may have the same height without including the inclined surface 130b.

The reflective sheet 120 is disposed between the bottom part 100a of the cover bottom CB and the light guide plate 130. The reflective sheet 120 reflects light, which is incident on the incident surface 130a of the light guide plate 130 and is emitted to the lower part of the light guide plate 130, to the light guide plate 130, thereby increasing efficiency of the light. Further, the reflective sheet 120 adjusts a reflective amount of the entire incident light so that the light emitted from the entire emissive surface 130c has a uniform luminance distribution.

The optical sheet 150 includes a diffusion sheet 150a, a prism sheet 150b, and a protective sheet 150c to diffuse and focus light incident from the light guide plate 130. The diffusion sheet 150a includes a base plate and a bead-shaped coating layer formed on the base plate. The diffusion sheet 150a diffuses light from the light source 140b and supplies the light to the liquid crystal display panel LCP. The prism sheet 150b is formed by uniformly arranging triangular cylinder-shaped prisms on an upper surface of the prism sheet 150b and focuses the light diffused by the diffusion sheet 150a in a direction vertical to the plane of the liquid crystal display panel LCP. The protective sheet 150c protects the prism sheet 150b weak to a scratch.

Each of the first and second supporting members SUP1 and SUP2 includes a base member 160, a light-shielding pad 163, and a hold pad 165.

The base members 160 of the first and second supporting members SUP1 and SUP2 surround a partial external surface of the bottom part 100a of the cover bottom CB and external surfaces, upper surfaces, and inner surfaces of the side walls 100c and 100e of the cover bottom CB. The base members 160 bend to the inside of the cover bottom CB at a predetermined position of the inner surfaces of the side walls 100c and 100e. More specifically, the base member 160 includes a first part 160a attached to the partial external surface of the bottom part 100a of the cover bottom CB, a second part 160b which bends from the first part 160a and is attached to the external surface of the side wall 100c (or 100e) of the cover bottom CB, a third part 160c which bends from the second part 160b and is attached to the upper surface of the side wall 100c (or 100e), a fourth part 160d which bends from the third part 160c and is attached to the inner surface of the side wall 100c (or 100e) using a double-sided tape 161, and a fifth part 160e which bends from the fourth part 160d and extends to the inside of the cover bottom CB. The base member 1 160 is formed of a thermoplastic material, for example, polyethylene terephthalate (PET).

The light-shielding pad 163 is attached to an upper surface of the fifth part 160e of the base member 160 and supports and fixes the liquid crystal display panel LCP which will be disposed on the light-shielding pad 163. Further, the light-shielding pad 163 prevents light from leaking to a bezel area BA. The light-shielding pad 163 divides the liquid crystal display panel LCP into a display area AA on which an image is displayed, and the bezel area BA on which the image is not displayed.

The hold pad 165 is attached to a lower surface of the fifth part 160e of the base member 160 and prevents the separation of the optical sheet 150. Because the base member 160 is formed of a flexible material, the base members 160 of the first and second supporting members SUP1 and SUP2 may bend due to the weight of the liquid crystal display panel LCP. In this instance, the hold pad 165 may be positioned to be separated from the optical sheet 150 by a predetermined distance, so as to prevent the optical sheet 150 from being damaged by the bending of the base members 160. However, the embodiment of the invention is not limited thereto. For example, the hold pad 165 may contact the optical sheet 150 or may be attached to the optical sheet 150.

The liquid crystal display panel LCP functions to display the image. The liquid crystal display panel LCP includes a thin film transistor (TFT) substrate 170a, on which a plurality of thin film transistors (TFTs) are arranged in a matrix form, a color filter substrate 170b attached to the TFT substrate 170a, and a liquid crystal layer (not shown) disposed between the substrates 170a and 170b.

The TFT substrate 170a is a transparent glass substrate on which the TFTs are arranged in the matrix form. A data line is connected to a source terminal of the TFT, and a gate line is connected to a gate terminal of the TFT. The data line and the gate line are respectively connected to driving integrated circuit (IC) chips (not shown). The flexible printed circuit board (not shown) is connected to one side of each driving IC chip. When an electrical signal is received from the flexible printed circuit board, the electrical signal is input to each of the data line and the gate line through the driving IC chips. Hence, the TFT disposed in each pixel is turned on or off, and a driving voltage is applied to each pixel or the application of the driving voltage to each pixel is blocked. As a result, an image is displayed on the liquid crystal display panel LCP.

The TFT substrate 170a is attached to the light-shielding pads 163 of the first and second supporting members SUP1 and SUP2. More specifically, the TFT substrate 170a is attached to the light-shielding pads 163, so that the light-shielding pads 163 slightly protrude to the outside of the TFT substrate 170a.

The color filter substrate 170b is disposed on the TFT substrate 170a and is attached to the TFT substrate 170a using a sealing material (180). The color filter substrate 170b is a substrate, on which color pixels (i.e., red, green, and blue pixels), each of which represents a predetermined color while light passes through them, are formed through a thin film process.

A first polarizing plate POL1 is formed on a lower surface of the TFT substrate 170a, and a second polarizing plate POL2 is formed on an upper surface of the color filter substrate 170b, thereby polarizing light.

In the liquid crystal display shown in FIG. 5, the first polarizing plate POL1 has a rectangular shape similar to the TFT substrate 170a of the liquid crystal display panel LCP. A first width of the first polarizing plate POL1 defined by a side of the first polarizing plate POL1, on which the light source unit 140 is disposed, and a side opposite to the side is less than a width of the TFT substrate 170a of the liquid crystal display panel LCP. Further, a second width of the first polarizing plate POL1 defined by the remaining opposite sides of the first polarizing plate POL1 is less than the width of the TFT substrate 170a of the liquid crystal display panel LCP.

The second polarizing plate POL2 has a rectangular shape similar to the color filter substrate 170b of the liquid crystal display panel LCP. A first width of the second polarizing plate POL2 defined by a side of the second polarizing plate POL2, on which the light source unit 140 is disposed, and a side opposite to the side is less than a width of the TFT substrate 170a of the liquid crystal display panel LCP. Further, a second width of the second polarizing plate POL2 defined by the remaining opposite sides of the second polarizing plate POL2 is less than the width of the TFT substrate 170a of the liquid crystal display panel LCP.

In the liquid crystal display shown in FIG. 6, the first polarizing plate POL1 has a rectangular shape similar to the TFT substrate 170a of the liquid crystal display panel LCP. A first width of the first polarizing plate POL1 defined by a side of the first polarizing plate POL1, on which the light source unit 140 is disposed, and a side opposite to the side is larger than a width of the TFT substrate 170a of the liquid crystal display panel LCP. Further, a second width of the first polarizing plate POL1 defined by the remaining opposite sides of the first polarizing plate POL1 is larger than the width of the TFT substrate 170a of the liquid crystal display panel LCP.

The second polarizing plate POL2 has a rectangular shape similar to the color filter substrate 170b of the liquid crystal display panel LCP. A first width of the second polarizing plate POL2 defined by a side of the second polarizing plate POL2, on which the light source unit 140 is disposed, and a side opposite to the side is less than a width of the TFT substrate 170a of the liquid crystal display panel LCP. Further, a second width of the second polarizing plate POL2 defined by the remaining opposite sides of the second polarizing plate POL2 is less than the width of the TFT substrate 170a of the liquid crystal display panel LCP.

In the second embodiment of the invention, the widths of the first and second polarizing plates POL1 and POL2 are less than the widths of the TFT substrate 170a and the color filter substrate 170b so as to improve the workability, unlike the first embodiment of the invention. Namely, in the liquid crystal display according to the second embodiment of the invention, the side walls 100b, 100c, 100d, and 100e of the cover bottom CB each have the same height as a mounting height of the liquid crystal display panel LCP. Therefore, if the first polarizing plate POL1 or the second polarizing plate POL2 of the liquid crystal display panel LCP protrudes to the outside of the cover bottom CB, the workability may be reduced when the liquid crystal display panel LCP is mounted. Hence, it is preferable that the widths of the first and second polarizing plates POL1 and POL2 are less than the widths of the TFT substrate 170a and the color filter substrate 170b.

In the liquid crystal display according to the second embodiment of the invention, because the liquid crystal display panel LCP is supported by the first and second supporting members SUP1 and SUP2 which surround the outside of the cover bottom CB and extend to the inside of the cover bottom CB, the bezel area occupied by the related art guide panel may be decreased.

Figure 7:
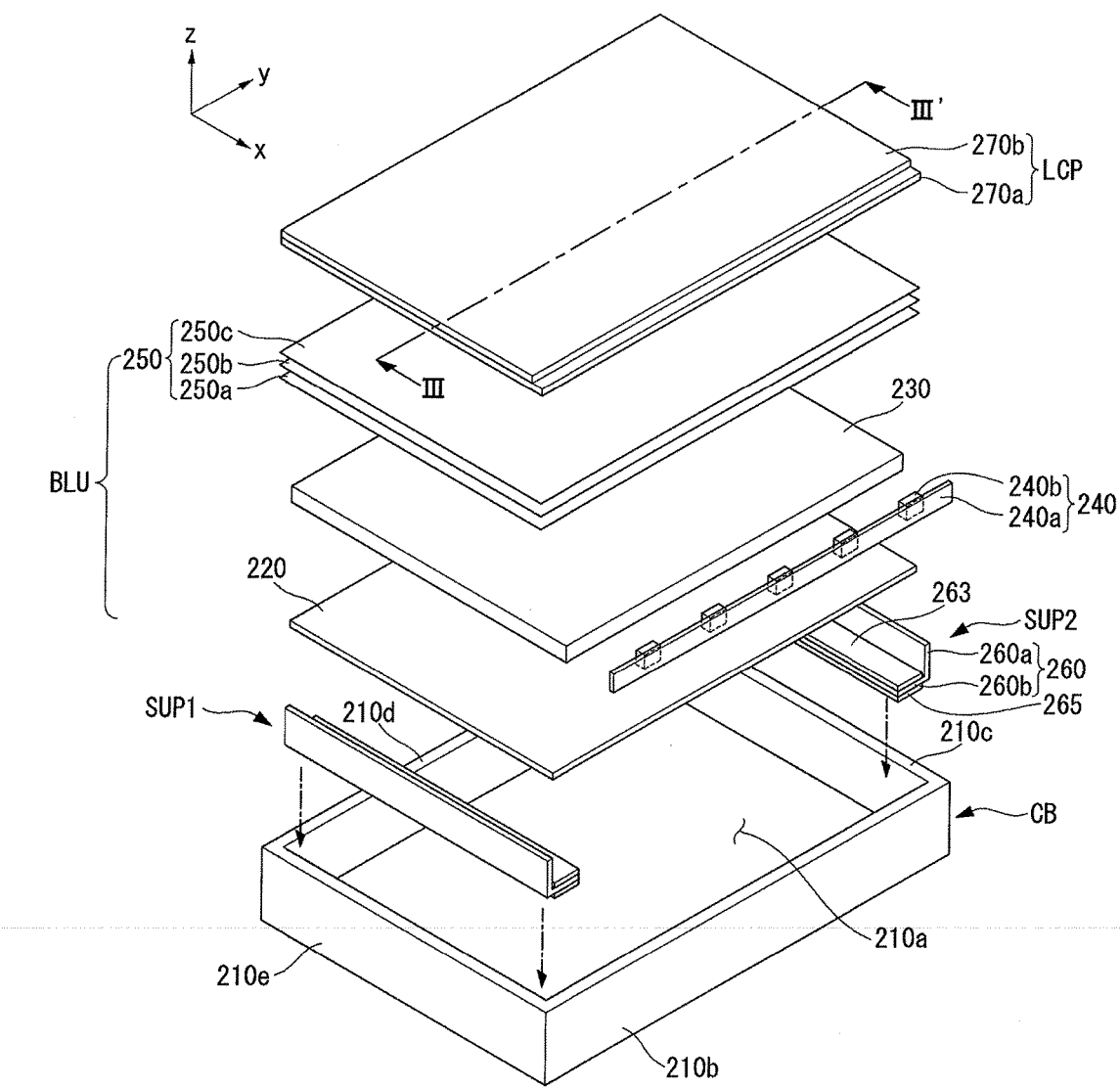
FIG. 7 is an exploded perspective view schematically showing a liquid crystal display according to a third embodiment of the invention.

Next, a liquid crystal display according to a third embodiment of the invention is described with reference to FIGS. 7 to 9. FIG. 7 is an exploded perspective view schematically showing the liquid crystal display according to the third embodiment of the invention, and FIGS. 8 and 9 are cross-sectionals view taken along line III-III' of FIG. 7.

Figure 8:
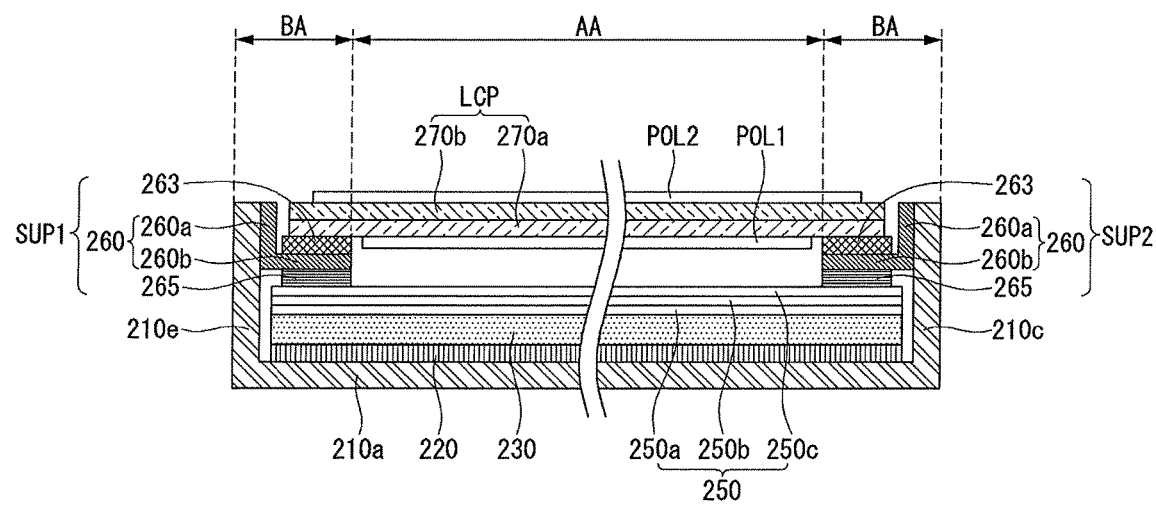
FIG. 8 is a cross-sectional view taken along line III-III' of FIG. 7 and shows an example where an upper polarizing plate is formed on a color filter substrate of a liquid crystal display panel at a width less than a width of the color filter substrate, and a lower polarizing plate is formed on a TFT substrate of the liquid crystal display panel between light-shielding pads of supporting members.
Figure 9:
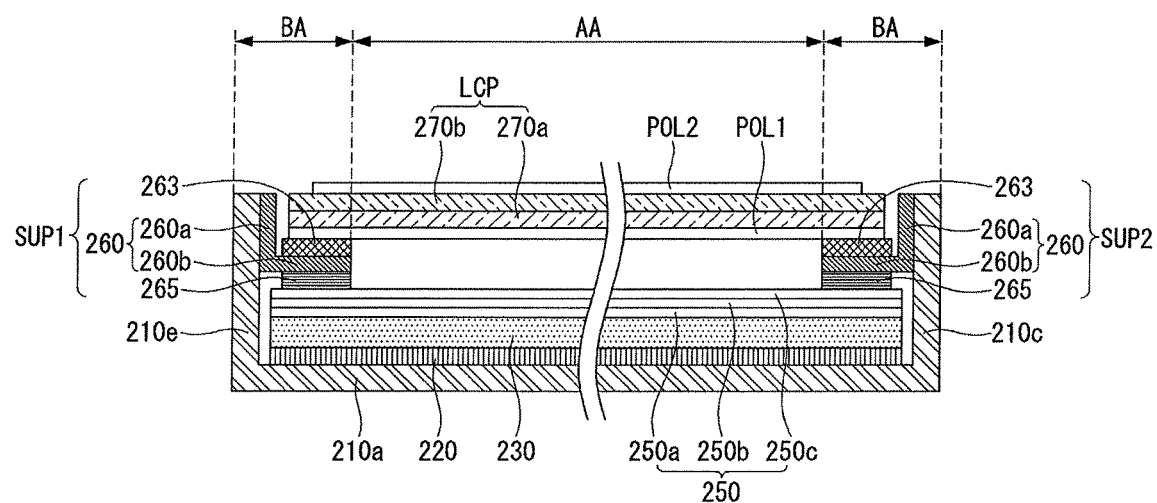
FIG. 9 is a cross-sectional view taken along line III-III' of FIG. 7 and shows an example where an upper polarizing plate is formed on a color filter substrate of a liquid crystal display panel at a width less than a width of the color filter substrate, and a lower polarizing plate is attached to both a TFT substrate of the liquid crystal display panel and light-shielding pads of supporting members.

Referring to FIGS. 7 to 9, the liquid crystal display according to the third embodiment of the invention includes a cover bottom CB, a backlight unit BLU received in the cover bottom CB, a liquid crystal display panel LCP disposed on the backlight unit BLU, and first and second supporting members SUP1 and SUP2 which are coupled with the cover bottom CB and support the liquid crystal display panel LCP.

The cover bottom CB includes a bottom part 210a on which the backlight unit BLU is positioned, and side walls 210b, 210c, 210d, and 210e extending from an edge of the bottom part 210a to the top. The cover bottom CB has a box shape, of which an upper part is opened. The cover bottom CB is formed of stainless steel (SUS) with excellent rigidity. A reflective sheet 220, a light guide plate 230, a light source unit 240, and an optical sheet 250 which constitute the backlight unit BLU, and the liquid crystal display panel LCP are sequentially stacked on the bottom part 210a of the cover bottom CB. The side walls 210b, 210c, 210d, and 210e of the cover bottom CB each have a height capable of receiving the components 220, 230, 240, 250, and LCP.

The backlight unit BLU includes the light source unit 240 supplying light to the liquid crystal display panel LCP, the light guide plate 230 which guides light coming from the light source unit 240 and supplies the light to the liquid crystal display panel LCP, the reflective sheet 220 which is positioned under the light guide plate 230 and reflects the light, and the optical sheet 250 which is positioned on the light guide plate 230, converts the light supplied by light sources 240b of the light source unit 240 into uniform planar light, and supplies the planar light to the liquid crystal display panel LCP.

The light source unit 240 is an edge type light source unit, in which the light source unit 240 is positioned opposite an incident surface of the light guide plate 230. The light source unit 240 includes a printed circuit board (PCB) 240a and at least one light emitting diode (LED) 240b (hereinafter referred to as "light source") mounted on the PCB 240a. The PCB 240a is a flexible board with excellent flexibility and turns on or off the light source 240b through a circuit mounted therein. In the third embodiment of the invention, the light source 240b may be configured as a top view type. In this instance, the flexible printed circuit board (FPCB) 240a may be installed on the side wall 210b of the cover bottom CB, and an upper part of the light source 240b mounted on the FPCB 240a may be positioned opposite the incident surface of the light guide plate 230. Alternatively, the light source 240b may be configured as a side view type. In this instance, the FPCB 240a may be installed on the bottom part 210a of the cover bottom CB, and the side of the light source 240b mounted on the FPCB 240a may be positioned opposite the incident surface of the light guide plate 230.

Because the incident surface of the light guide plate 230 is positioned opposite the light source 240b, light emitted from the light source 240b is incident on the light guide plate 230 through the incident surface. In this instance, the light guide plate 230 causes light, which is emitted from the light source 240b and then is incident on the incident surface of the light guide plate 230, to travel in an upward direction of the light guide plate 230, i.e., toward the liquid crystal display panel LCP. For this, a diffusion pattern (not shown), which scatters light traveling to a lower part of the light guide plate 230 to thereby cause the light to travel in the upward direction of the light guide plate 230, may be formed on a bottom surface of the light guide plate 230. The light guide plate 230 converts the light incident from the light source 240b into uniform planar light and emits the planar light to the optical sheet 250 positioned on the light guide plate 230. The light guide plate 230 is formed of a material having a good refractive index and a good transmittance, for example, polymethylenemethacrylate (PMA), polycarbonate (PC), polyethylene (PE), cycloolefin-based resin (for example, cycloolefin polymer (COP)), etc. Other materials may be used for the light guide plate 230.

FIG. 7 shows the light guide plate 230 having a rectangular shape in the third embodiment of the invention. On the other hand, the light guide plate 230 may include an incident surface, on which light from the light source 240b is incident, an emissive surface, positioned opposite the liquid crystal display panel LCP, from which the incident light is emitted, and an inclined surface connecting the incident surface to the emissive surface. In this instance, a height of the inclined surface may be gradually lowered or may be lowered at a right angle as it goes from the incident surface to the emissive surface. The emissive surface may have a constant height.

The reflective sheet 220 is disposed between the bottom part 210a of the cover bottom CB and the light guide plate 230. The reflective sheet 220 reflects light, which is incident on the incident surface of the light guide plate 230 and is emitted to the lower part of the light guide plate 230, to the light guide plate 230, thereby increasing efficiency of the light. Further, the reflective sheet 220 adjusts a reflective amount of the entire incident light so that the light emitted from the light guide plate 230 has a uniform luminance distribution.

The optical sheet 250 includes a diffusion sheet 250a, a prism sheet 250b, and a protective sheet 250c to diffuse and focus light incident from the light guide plate 230. The diffusion sheet 250a includes a base plate and a bead-shaped coating layer formed on the base plate. The diffusion sheet 250a diffuses light from the light source 240b and supplies the light to the liquid crystal display panel LCP. The prism sheet 250b is formed by uniformly arranging triangular cylinder-shaped prisms on an upper surface of the prism sheet 250b and focuses the light diffused by the diffusion sheet 250a in a direction vertical to the plane of the liquid crystal display panel LCP. The protective sheet 250c is formed on the prism sheet 250b so as to protect the prism sheet 250b weak to a scratch.

Each of the first and second supporting members SUP1 and SUP2 includes a base member 260, a light-shielding pad 263, and a hold pad 265.

The base members 260 of the first and second supporting members SUP1 and SUP2 are attached to partial inner surfaces of the side walls 210c and 210e of the cover bottom CB and bend to the inside of the cover bottom CB, thereby having a "⌞" shape. More specifically, the base member 260 includes a first part 260a attached to the partial inner surface of the side wall 210c (or 210e) of the cover bottom CB and a second part 260b which bends from the first part 260a and extends to the inside of the cover bottom CB. The base member 260 is formed of a thermoplastic material, for example, polyethylene terephthalate (PET).

The light-shielding pad 263 is attached to an upper surface of the second part 260b of the base member 260 and supports and fixes the liquid crystal display panel LCP which will be disposed on the light-shielding pad 263. Further, the light-shielding pad 263 prevents light from leaking to a bezel area BA. The light-shielding pad 263 divides the liquid crystal display panel LCP into a display area AA on which an image is displayed, and the bezel area BA on which the image is not displayed.

The hold pad 265 is positioned on a lower surface of the second part 260b of the base member 260 and prevents the separation of the optical sheet 250. The hold pad 265 may be positioned to be separated from the optical sheet 250 by a predetermined distance. Alternatively, the hold pad 265 may contact the optical sheet 250 or may be attached to the optical sheet 250.

The liquid crystal display panel LCP functions to display the image. The liquid crystal display panel LCP includes a thin film transistor (TFT) substrate 270a, on which a plurality of thin film transistors (TFTs) are arranged in a matrix form, a color filter substrate 270b attached to the TFT substrate 270a, and a liquid crystal layer (not shown) disposed between the substrates 270a and 270b.

The TFT substrate 270a is a transparent glass substrate on which the TFTs are arranged in the matrix form. A data line is connected to a source terminal of the TFT, and a gate line is connected to a gate terminal of the TFT. The data line and the gate line are respectively connected to driving integrated circuit (IC) chips (not shown). The flexible printed circuit board (not shown) is connected to one side of each driving IC chip. When an electrical signal is received from the flexible printed circuit board, the electrical signal is input to each of the data line and the gate line through the driving IC chips. Hence, the TFT disposed in each pixel is turned on or off, and a driving voltage is applied to each pixel or the application of the driving voltage to each pixel is blocked. As a result, an image is displayed on the liquid crystal display panel LCP.

The TFT substrate 270a is attached to the light-shielding pads 263 of the first and second supporting members SUP1 and SUP2. More specifically, the TFT substrate 270a is attached to the light-shielding pads 263, so that the light-shielding pads 263 slightly protrude to the outside of the TFT substrate 270a.

The color filter substrate 270b is disposed on the TFT substrate 270a and is attached to the TFT substrate 270a using a sealing material (not shown). The color filter substrate 270b is a substrate, on which color pixels (i.e., red, green, and blue pixels), each of which represents a predetermined color while light passes through them, are formed through a thin film process.

A first polarizing plate POL1 is formed on a lower surface of the TFT substrate 270a, and a second polarizing plate POL2 is formed on an upper surface of the color filter substrate 270b, thereby polarizing light.

In the liquid crystal display shown in FIG. 8, the first polarizing plate POL1 has a rectangular shape similar to the TFT substrate 270a of the liquid crystal display panel LCP. A first width of the first polarizing plate POL1 defined by a side of the first polarizing plate POL1, on which the light source unit 240 is disposed, and a side opposite to the side is less than a width of the TFT substrate 270a of the liquid crystal display panel LCP. Further, a second width of the first polarizing plate POL1 defined by the remaining opposite sides of the first polarizing plate POL1 is less than the width of the TFT substrate 270a of the liquid crystal display panel LCP. More specifically, the second width of the first polarizing plate POL1 is formed between the light-shielding pads 263 of the first and second supporting members SUP1 and SUP2 and thus is formed between both sides of the TFT substrate 270a of the liquid crystal display panel LCP. Hence, the second width of the first polarizing plate POL1 is less than the width of the TFT substrate 270a.

The second polarizing plate POL2 has a rectangular shape similar to the color filter substrate 270b of the liquid crystal display panel LCP. A first width of the second polarizing plate POL2 defined by a side of the second polarizing plate POL2, on which the light source unit 240 is disposed, and a side opposite to the side is less than the width of the TFT substrate 270a of the liquid crystal display panel LCP. Further, a second width of the second polarizing plate POL2 defined by the remaining opposite sides of the second polarizing plate POL2 is less than the width of the TFT substrate 270a of the liquid crystal display panel LCP.

In the liquid crystal display shown in FIG. 9, the first polarizing plate POL1 has a rectangular shape similar to the TFT substrate 270a of the liquid crystal display panel LCP. A first width of the first polarizing plate POL1 defined by a side of the first polarizing plate POL1, on which the light source unit 240 is disposed, and a side opposite to the side is substantially same to a width of the TFT substrate 270a of the liquid crystal display panel LCP. Further, a second width of the first polarizing plate POL1 defined by the remaining opposite sides of the first polarizing plate POL1 is substantially same to the width of the TFT substrate 270a of the liquid crystal display panel LCP.

The second polarizing plate POL2 has a rectangular shape similar to the color filter substrate 270b of the liquid crystal display panel LCP. A first width of the second polarizing plate POL2 defined by a side of the second polarizing plate POL2, on which the light source unit 240 is disposed, and a side opposite to the side is less than the width of the TFT substrate 270a of the liquid crystal display panel LCP. Further, a second width of the second polarizing plate POL2 defined by the remaining opposite sides of the second polarizing plate POL2 is less than the width of the TFT substrate 270a of the liquid crystal display panel LCP.

In the liquid crystal display according to the third embodiment of the invention, because the liquid crystal display panel LCP is supported by the first and second supporting members SUP1 and SUP2, which are attached to the inner surfaces of the side walls of the cover bottom CB and extend to the inside of the cover bottom CB, the bezel area occupied by the related art guide panel may be decreased.

The third embodiment of the invention described that the first and second supporting members SUP1 and SUP2 support the liquid crystal display panel LCP, but is not limited thereto. For example, the liquid crystal display panel LCP may be supported by one supporting member formed by coupling the first and second supporting members SUP1 and SUP2.

Figure 10:
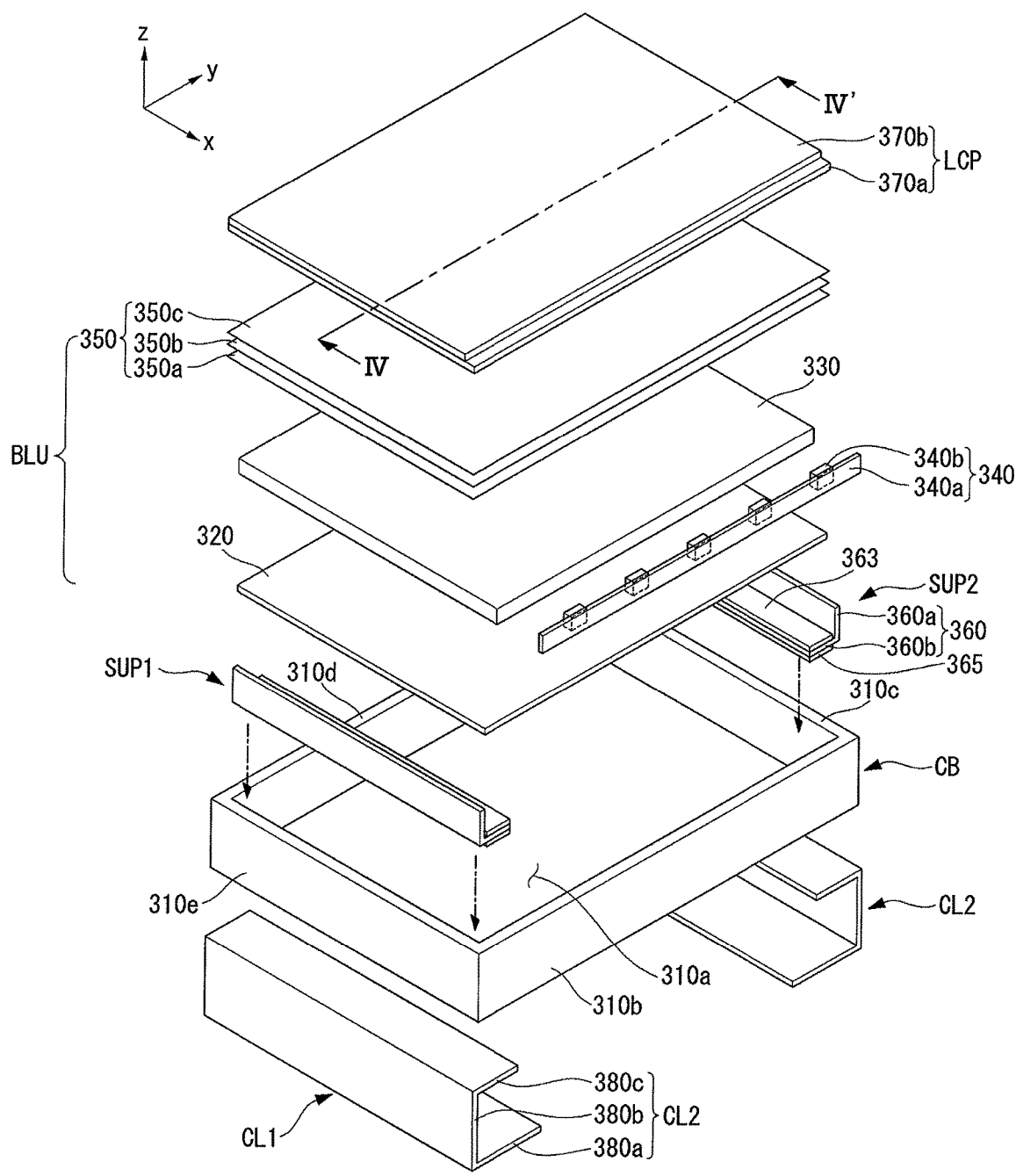
FIG. 10 is an exploded perspective view schematically showing a liquid crystal display according to a fourth embodiment of the invention.

Next, a liquid crystal display according to a fourth embodiment of the invention is described with reference to FIGS. 10 to 12. FIG. 10 is an exploded perspective view schematically showing the liquid crystal display according to the fourth embodiment of the invention, and FIGS. 11 and 12 are cross-sectionals view taken along line IV-IV' of FIG. 10.

Figure 11:
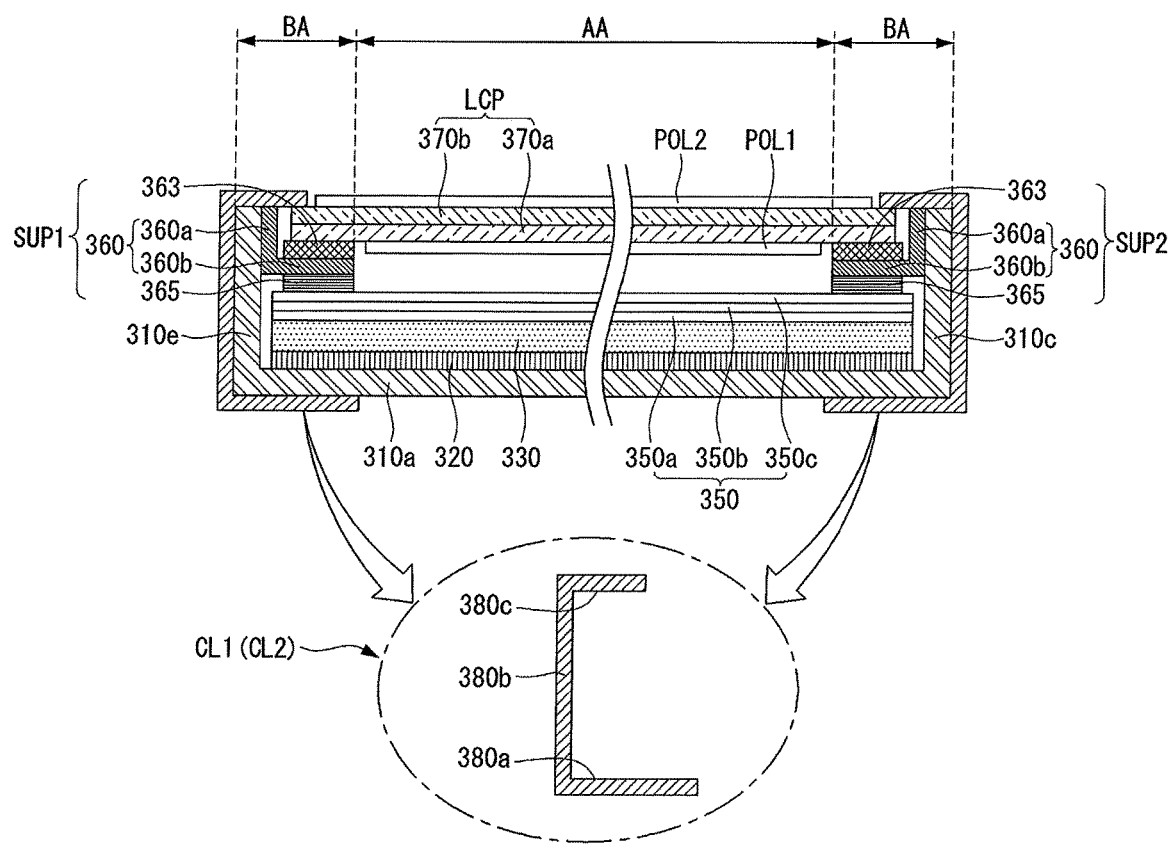
FIG. 11 is a cross-sectional view taken along line IV-IV' of FIG. 10 and shows an example where both ends of an upper polarizing plate are attached to a color filter substrate of a liquid crystal display panel in an area of the color filter substrate, and a lower polarizing plate is formed on a TFT substrate of the liquid crystal display panel between light-shielding pads of supporting members.
Figure 12:
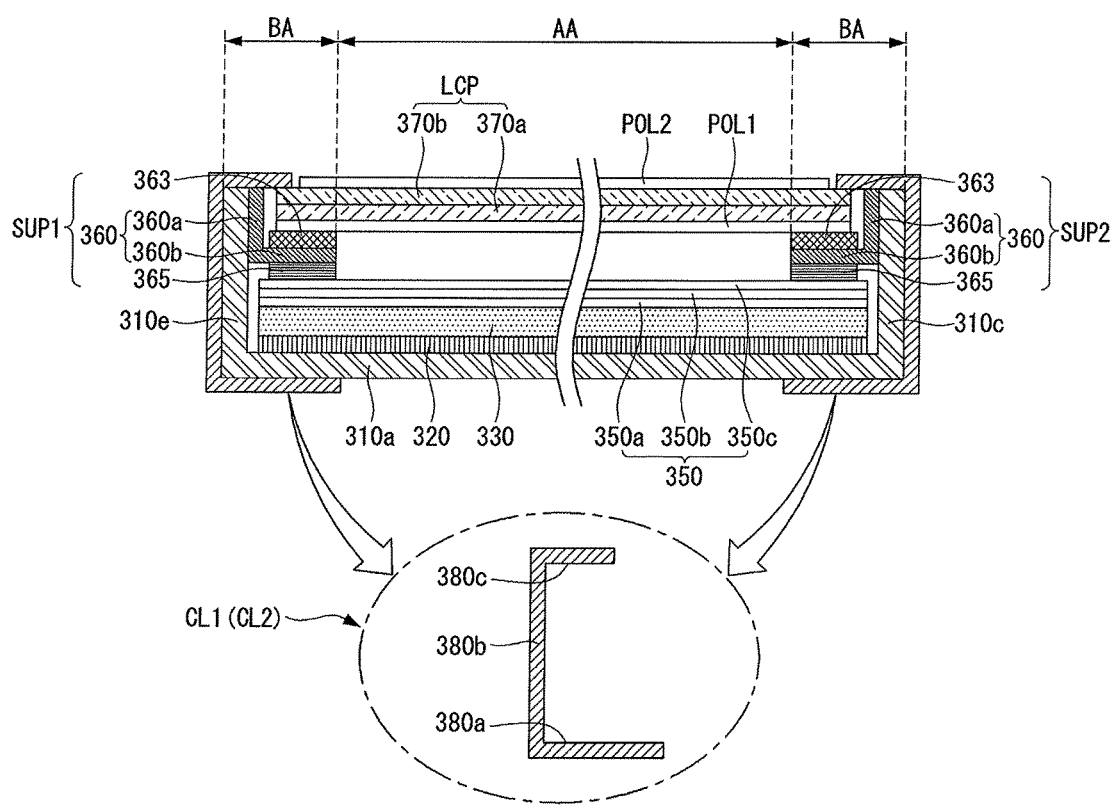
FIG. 12 is a cross-sectional view taken along line IV-IV' of FIG. 10 and shows an example where both ends of an upper polarizing plate are attached to a color filter substrate of a liquid crystal display panel in an area of the color filter substrate, and a lower polarizing plate is attached to both a TFT substrate of the liquid crystal display panel and light-shielding pads of supporting members.

Referring to FIGS. 10 to 12, the liquid crystal display according to the fourth embodiment of the invention includes a cover bottom CB, a backlight unit BLU received in the cover bottom CB, a liquid crystal display panel LCP disposed on the backlight unit BLU, first and second supporting members SUP1 and SUP2 which are coupled with the cover bottom CB and support the liquid crystal display panel LCP, and first and second clips CL1 and CL2 which are coupled with the cover bottom CB and maintain the liquid crystal display panel LCP. The liquid crystal display according to the fourth embodiment of the invention is different from the liquid crystal display according to the third embodiment of the invention, in that the first and second clips CL1 and CL2 for maintaining the cover bottom CB and the liquid crystal display panel LCP are additionally formed. The difference is described in detail below.

The cover bottom CB includes a bottom part 310a on which the backlight unit BLU is positioned, and side walls 310b, 310c, 310d, and 310e extending from an edge of the bottom part 310a to the top. The cover bottom CB has a box shape, of which an upper part is opened. The cover bottom CB is formed of stainless steel (SUS) with excellent rigidity. A reflective sheet 320, a light guide plate 330, a light source unit 340, and an optical sheet 350 which constitute the backlight unit BLU, and the liquid crystal display panel LCP are sequentially stacked on the bottom part 310a of the cover bottom CB. The side walls 310b, 310c, 310d, and 310e of the cover bottom CB each have a height capable of receiving the components 320, 330, 340, 350, and LCP.

The backlight unit BLU includes the light source unit 340 supplying light to the liquid crystal display panel LCP, the light guide plate 330 which guides light coming from the light source unit 340 and supplies the light to the liquid crystal display panel LCP, the reflective sheet 320 which is positioned under the light guide plate 330 and reflects the light, and the optical sheet 350 which is positioned on the light guide plate 330, converts the light supplied by light sources 340b of the light source unit 340 into uniform planar light, and supplies the planar light to the liquid crystal display panel LCP.

The light source unit 340 is an edge type light source unit, in which the light source unit 340 is positioned opposite an incident surface of the light guide plate 330. The light source unit 340 includes a printed circuit board (PCB) 340a and at least one light emitting diode (LED) 340b (hereinafter referred to as "light source") mounted on the PCB 340a. The PCB 340a is a flexible board with excellent flexibility and turns on or off the light source 340b through a circuit mounted therein. In the fourth embodiment of the invention, the light source 340b may be configured as a top view type. In this instance, the flexible printed circuit board (FPCB) 340a may be installed on the side wall 310b of the cover bottom CB, and an upper part of the light source 340b mounted on the FPCB 340a may be positioned opposite the incident surface of the light guide plate 330. Alternatively, the light source 340b may be configured as a side view type. In this instance, the FPCB 340a may be installed on the bottom part 310a of the cover bottom CB, and the side of the light source 340b mounted on the FPCB 340a may be positioned opposite the incident surface of the light guide plate 330.

Because the incident surface of the light guide plate 330 is positioned opposite the light source 340b, light emitted from the light source 340b is incident on the light guide plate 330 through the incident surface. In this instance, the light guide plate 330 causes light, which is emitted from the light source 340b and then is incident on the incident surface of the light guide plate 330, to travel in an upward direction of the light guide plate 330, i.e., toward the liquid crystal display panel LCP. For this, a diffusion pattern (not shown), which scatters light traveling to a lower part of the light guide plate 330 to thereby cause the light to travel in the upward direction of the light guide plate 330, may be formed on a bottom surface of the light guide plate 330. The light guide plate 330 converts the light incident from the light source 340b into uniform planar light and emits the planar light to the optical sheet 350 positioned on the light guide plate 330. The light guide plate 330 is formed of a material having a good refractive index and a good transmittance, for example, polymethylenemethacrylate (PMA), polycarbonate (PC), polyethylene (PE), cycloolefin-based resin (for example, cycloolefin polymer (COP)), etc. Other materials may be used for the light guide plate 330.

FIG. 10 shows the light guide plate 330 having a rectangular shape in the fourth embodiment of the invention. On the other hand, the light guide plate 330 may include an incident surface, on which light from the light source 340b is incident, an emissive surface, positioned opposite the liquid crystal display panel LCP, from which the incident light is emitted, and an inclined surface connecting the incident surface to the emissive surface. In this instance, a height of the inclined surface may be gradually lowered or may be lowered at a right angle as it goes from the incident surface to the emissive surface. The emissive surface may have a constant height.

The reflective sheet 320 is disposed between the bottom part 310a of the cover bottom CB and the light guide plate 330. The reflective sheet 320 reflects light, which is incident on the incident surface of the light guide plate 330 and is emitted to the lower part of the light guide plate 330, to the light guide plate 330, thereby increasing efficiency of the light. Further, the reflective sheet 320 adjusts a reflective amount of the entire incident light so that the light emitted from the light guide plate 330 has a uniform luminance distribution.

The optical sheet 350 includes a diffusion sheet 350a, a prism sheet 350b, and a protective sheet 350c to diffuse and focus light incident from the light guide plate 330. The diffusion sheet 350a includes a base plate and a bead-shaped coating layer formed on the base plate. The diffusion sheet 350a diffuses light from the light source 340b and supplies the light to the liquid crystal display panel LCP. The prism sheet 350b is formed by uniformly arranging triangular cylinder-shaped prisms on an upper surface of the prism sheet 350b and focuses the light diffused by the diffusion sheet 350a in a direction vertical to the plane of the liquid crystal display panel LCP. The protective sheet 350c protects the prism sheet 350b weak to a scratch.

Each of the first and second supporting members SUP1 and SUP2 includes a base member 360, a light-shielding pad 363, and a hold pad 365.

The base members 360 of the first and second supporting members SUP1 and SUP2 are attached to partial inner surfaces of the side walls 310c and 310e of the cover bottom CB and bend to the inside of the cover bottom CB, thereby having a "⌐" shape. More specifically, the base member 360 includes a first part 360a attached to the partial inner surface of the side wall 310c (or 310e) of the cover bottom CB and a second part 360b which bends from the first part 360a and extends to the inside of the cover bottom CB. The base member 360 is formed of a thermoplastic material, for example, polyethylene terephthalate (PET).

The light-shielding pad 363 is attached to an upper surface of the second part 360b of the base member 360 and supports and fixes the liquid crystal display panel LCP which will be disposed on the light-shielding pad 363. Further, the light-shielding pad 363 prevents light from leaking to a bezel area BA. The light-shielding pad 363 divides the liquid crystal display panel LCP into a display area AA on which an image is displayed, and the bezel area BA on which the image is not displayed.

The hold pad 365 is positioned on a lower surface of the second part 360b of the base member 360 and prevents the separation of the optical sheet 350. The hold pad 365 may be positioned to be separated from the optical sheet 350 by a predetermined distance. Alternatively, the hold pad 365 may contact the optical sheet 350 or may be attached to the optical sheet 350.

The liquid crystal display panel LCP functions to display the image. The liquid crystal display panel LCP includes a thin film transistor (TFT) substrate 370a, on which a plurality of thin film transistors (TFTs) are arranged in a matrix form, a color filter substrate 370b attached to the TFT substrate 370a, and a liquid crystal layer (not shown) disposed between the substrates 370a and 370b.

The TFT substrate 370a is a transparent glass substrate on which the TFTs are arranged in the matrix form. A data line is connected to a source terminal of the TFT, and a gate line is connected to a gate terminal of the TFT. The data line and the gate line are respectively connected to driving integrated circuit (IC) chips (not shown). The flexible printed circuit board (not shown) is connected to one side of each driving IC chip. When an electrical signal is received from the flexible printed circuit board, the electrical signal is input to each of the data line and the gate line through the driving IC chips. Hence, the TFT disposed in each pixel is turned on or off, and a driving voltage is applied to each pixel or the application of the driving voltage to each pixel is blocked. As a result, an image is displayed on the liquid crystal display panel LCP.

The TFT substrate 370a is attached to the light-shielding pads 363 of the first and second supporting members SUP1 and SUP2. More specifically, the TFT substrate 370a is attached to the light-shielding pads 363, so that the light-shielding pads 363 slightly protrude to the outside of the TFT substrate 370a.

The color filter substrate 370b is disposed on the TFT substrate 370a and is attached to the TFT substrate 370a using a sealing material (not shown). The color filter substrate 370b is a substrate, on which color pixels (i.e., red, green, and blue pixels), each of which represents a predetermined color while light passes through them, are formed through a thin film process.

A first polarizing plate POL1 is formed on a lower surface of the TFT substrate 370a, and a second polarizing plate POL2 is formed on an upper surface of the color filter substrate 370b, thereby polarizing light.

In the liquid crystal display shown in FIG. 11, the first polarizing plate POL1 has a rectangular shape similar to the TFT substrate 370a of the liquid crystal display panel LCP. A first width of the first polarizing plate POL1 defined by a side of the first polarizing plate POL1, on which the light source unit 340 is disposed, and a side opposite to the side is less than a width of the TFT substrate 370a of the liquid crystal display panel LCP. Further, a second width of the first polarizing plate POL1 defined by the remaining opposite sides of the first polarizing plate POL1 is less than the width of the TFT substrate 370a of the liquid crystal display panel LCP.

The second polarizing plate POL2 has a rectangular shape similar to the color filter substrate 370b of the liquid crystal display panel LCP. A first width of the second polarizing plate POL2 defined by a side of the second polarizing plate POL2, on which the light source unit 340 is disposed, and a side opposite to the side is less than a width of the TFT substrate 370a of the liquid crystal display panel LCP. Further, a second width of the second polarizing plate POL2 defined by the remaining opposite sides of the second polarizing plate POL2 is less than the width of the TFT substrate 370a of the liquid crystal display panel LCP.

In the liquid crystal display shown in FIG. 12, the first polarizing plate POL1 has a rectangular shape similar to the TFT substrate 370a of the liquid crystal display panel LCP. A first width of the first polarizing plate POL1 defined by a side of the first polarizing plate POL1, on which the light source unit 340 is disposed, and a side opposite to the side is substantially same to a width of the TFT substrate 370a of the liquid crystal display panel LCP. Further, a second width of the first polarizing plate POL1 defined by the remaining opposite sides of the first polarizing plate POL1 is substantially same to the width of the TFT substrate 370a of the liquid crystal display panel LCP.

The second polarizing plate POL2 has a rectangular shape similar to the color filter substrate 370b of the liquid crystal display panel LCP. A first width of the second polarizing plate POL2 defined by a side of the second polarizing plate POL2, on which the light source unit 340 is disposed, and a side opposite to the side is less than the width of the TFT substrate 370a of the liquid crystal display panel LCP. Further, a second width of the second polarizing plate POL2 defined by the remaining opposite sides of the second polarizing plate POL2 is less than the width of the TFT substrate 370a of the liquid crystal display panel LCP.

The first and second clips CL1 and CL2 each have "t" shape. More specifically, the first and second clips CL1 and CL2 surround a partial external surface of the bottom part 310a of the cover bottom CB and external surfaces and upper surfaces of the side walls 310c and 310e of the cover bottom CB, and extend from the upper surfaces of the side walls 310c and 310e to the inside of the cover bottom CB. Namely, each of the first and second clips CL1 and CL2 includes a first part 380a attached to the partial external surface of the bottom part 310a of the cover bottom CB, a second part 380b which bends from the first part 380a and is attached to the external surface of the side wall 310c (or 310e) of the cover bottom CB, and a third part 380c which bends from the second part 380b, is attached to the upper surface of the side wall 310c (or 310e) of the cover bottom CB, extends from the upper surface of the side wall 310c (or 310e) to the inside of the cover bottom CB, and is positioned on the color filter substrate 370b of the liquid crystal display panel LCP. The first and second clips CL1 and CL2 are formed of a thermoplastic material, for example, polyethylene terephthalate (PET) in the same manner as the first and second supporting members SUP1 and SUP2.

The first and second clips CL1 and CL2 are coupled with the cover bottom CB to prevent the liquid crystal display panel LCP from being moved.

In the liquid crystal display according to the fourth embodiment of the invention, because the liquid crystal display panel LCP is supported by the first and second supporting members SUP1 and SUP2, which are attached to the inner surfaces of the side walls of the cover bottom CB and extend to the inside of the cover bottom CB, the bezel area occupied by the related art guide panel may be decreased.

Further, in the liquid crystal display according to the fourth embodiment of the invention, because the movement of the liquid crystal display panel LCP is prevented by the first and second clips CL1 and CL2 which are coupled with the cover bottom CB and extend to the upper part of the color filter substrate 370b of the liquid crystal display panel LCP, the stability of the liquid crystal display panel LCP may increase.

The fourth embodiment of the invention described that the first and second clips CL1 and CL2 prevent the movement of the liquid crystal display panel LCP, but is not limited thereto. For example, the liquid crystal display panel LCP may be supported by one clip formed by coupling the first and second clips CL1 and CL2.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display comprising:
   a liquid crystal display panel configured to display an image;
   a light source unit configured to supply light to the liquid crystal display panel;
   a light guide plate configured to convert light irradiated by the light source unit into planar light;
   at least one optical sheet disposed between the liquid crystal display panel and the light guide plate;
   a cover bottom including a bottom part and side walls extending from edges of the bottom part to an upper side, the cover bottom receiving the light source unit and the light guide plate; and
   a supporting member configured to surround an external surface of the cover bottom, extend from an upper part of the light guide plate to an inside of the cover bottom, and support the liquid crystal display panel,
   wherein the supporting member includes:
      a base member having a first part directly attached to an external surface of the bottom part of the cover bottom, a second part extended from the first part and directly attached to an external surface of the side walls of the cover bottom, and a third part extended from the second part to an inside of the cover bottom to overlap one portion of the liquid crystal display panel and one portion of the at least one optical sheet;
      a light-shielding pad disposed on the third part of the base member between the base member and a first polarizer,
      wherein an end of the light-shielding pad extends to a location having a first horizontal distance measured from the second part of the base member that is equal to a second horizontal distance that an end of the third part of the base member extends from the second part of the base member to divide the liquid crystal display panel into a display area on which the image is displayed and a bezel area on which the image is not displayed; and
      a hold pad disposed between the third part of the base member and the one portion of the at least one optical sheet to overlap the light-shielding pad and the one portion of the at least one optical sheet.

2. The liquid crystal display of claim 1, wherein the side walls of the cover bottom have a height capable of receiving the light source unit and the light guide plate.

3. The liquid crystal display of claim 2, wherein the side walls of the cover bottom include a first side wall to which the light source unit is attached, a second side wall positioned opposite the first side wall, a third side wall and a fourth side wall which connect the first side wall to the second side wall and are positioned opposite each other, and
   wherein the supporting member includes a first supporting member, which extends from a top of the third side wall to an inside of the cover bottom, and a second supporting member which is positioned to be separated from the first supporting member and extends from a top of the fourth side wall to the inside of the cover bottom.

4. The liquid crystal display of claim 2, wherein the third part of the base member has a first horizontal portion extended from the second part and arranged in parallel with the first part, a vertical portion arranged and extended from the first horizontal portion in parallel with the second part, and a second horizontal portion extended from the vertical portion and arranged in parallel with the first part.

5. The liquid crystal display of claim 4, wherein the light-shielding pad is disposed between the second horizontal portion of the third part of the base member and the one portion of the liquid crystal display panel, and the hold pad is disposed between the second horizontal portion of the third part of the base member and the one portion of the at least one optical sheet.

6. The liquid crystal display of claim 5, wherein the vertical portion is attached to the side wall of the cover bottom by a double-sided tape.

7. The liquid crystal display of claim 1, wherein the side walls of the cover bottom each have a height capable of receiving the light source unit, the light guide plate, and the liquid crystal display panel.

8. The liquid crystal display of claim 7, wherein the side walls of the cover bottom include a first side wall to which the light source unit is attached, a second side wall positioned opposite the first side wall, a third side wall and a fourth side wall which connect the first side wall to the second side wall and are positioned opposite each other, and
   wherein the supporting member includes a first supporting member, which bends from a top of the third side wall, extends to a predetermined position of the third side wall in a direction toward the bottom part of the cover bottom, and extends to the inside of the cover bottom at the predetermined position, and a second supporting member which bends from a top of the fourth side wall, extends to a predetermined position of the fourth side wall in a direction toward the bottom part of the cover bottom, and extends to the inside of the cover bottom at the predetermined position.

9. The liquid crystal display of claim 1, wherein the base member of the supporting member is formed of a thermoplastic material.

* * * * *